US011361545B1

(12) United States Patent
Hsu et al.

(10) Patent No.: US 11,361,545 B1
(45) Date of Patent: Jun. 14, 2022

(54) MONITORING DEVICE FOR DETECTING OBJECT OF INTEREST AND OPERATION METHOD THEREOF

(71) Applicant: HIMAX TECHNOLOGIES LIMITED, Tainan (TW)

(72) Inventors: Chin-Kuei Hsu, Tainan (TW); Ti-Wen Tang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/953,327

(22) Filed: Nov. 20, 2020

(51) Int. Cl.
*G06K 9/00* (2022.01)
*G06V 20/40* (2022.01)
*G06T 7/215* (2017.01)
*G06V 10/25* (2022.01)
*G06V 40/10* (2022.01)

(52) U.S. Cl.
CPC .............. *G06V 20/41* (2022.01); *G06T 7/215* (2017.01); *G06V 10/25* (2022.01); *G06V 40/10* (2022.01); *G06T 2207/20084* (2013.01); *G06V 2201/07* (2022.01)

(58) Field of Classification Search
CPC ............. G06K 9/00718; G06K 9/3233; G06K 9/00362; G06K 2209/21; G06T 7/215; G06T 2207/20084
See application file for complete search history.

(56) References Cited

U.S. PATENT DOCUMENTS

| 2016/0171311 A1* | 6/2016 | Case | G06K 9/00771 |
| | | | 382/103 |
| 2016/0277645 A1* | 9/2016 | Bitouk | G06K 9/6284 |
| 2019/0080196 A1* | 3/2019 | Choi | G06T 7/254 |
| 2019/0102889 A1* | 4/2019 | Azanza | H04N 19/543 |
| 2019/0332897 A1* | 10/2019 | Chen | G06K 9/00771 |
| 2020/0134837 A1* | 4/2020 | Varadarajan | G06K 9/00718 |
| 2021/0124968 A1* | 4/2021 | Ashani | G06K 9/622 |

FOREIGN PATENT DOCUMENTS

TW  201944283  11/2019

OTHER PUBLICATIONS

"Office Action of Taiwan Counterpart Application", dated Nov. 29, 2021, p. 1-p. 8.

* cited by examiner

*Primary Examiner* — Dhaval V Patel
(74) *Attorney, Agent, or Firm* — JCIPRNET

(57) ABSTRACT

A monitoring device and an operation method thereof are provided to detect whether an object of interest appears in a video stream. The monitoring device includes a motion calculation circuit, a motion region determination circuit and a computing engine. The motion calculation circuit performs motion calculation on a current frame in the video stream to generate a motion map. The motion region determination circuit determines a motion region in the current frame according to the motion map. The motion region determination circuit notifies the computing engine with the motion region in the current frame. The computing engine performs an object of interest detection on the motion region in the current frame of the video stream to generate a detection result. The motion region determination circuit determines whether to ignore the motion region in a subsequent frame after the current frame according to the detection result.

10 Claims, 2 Drawing Sheets

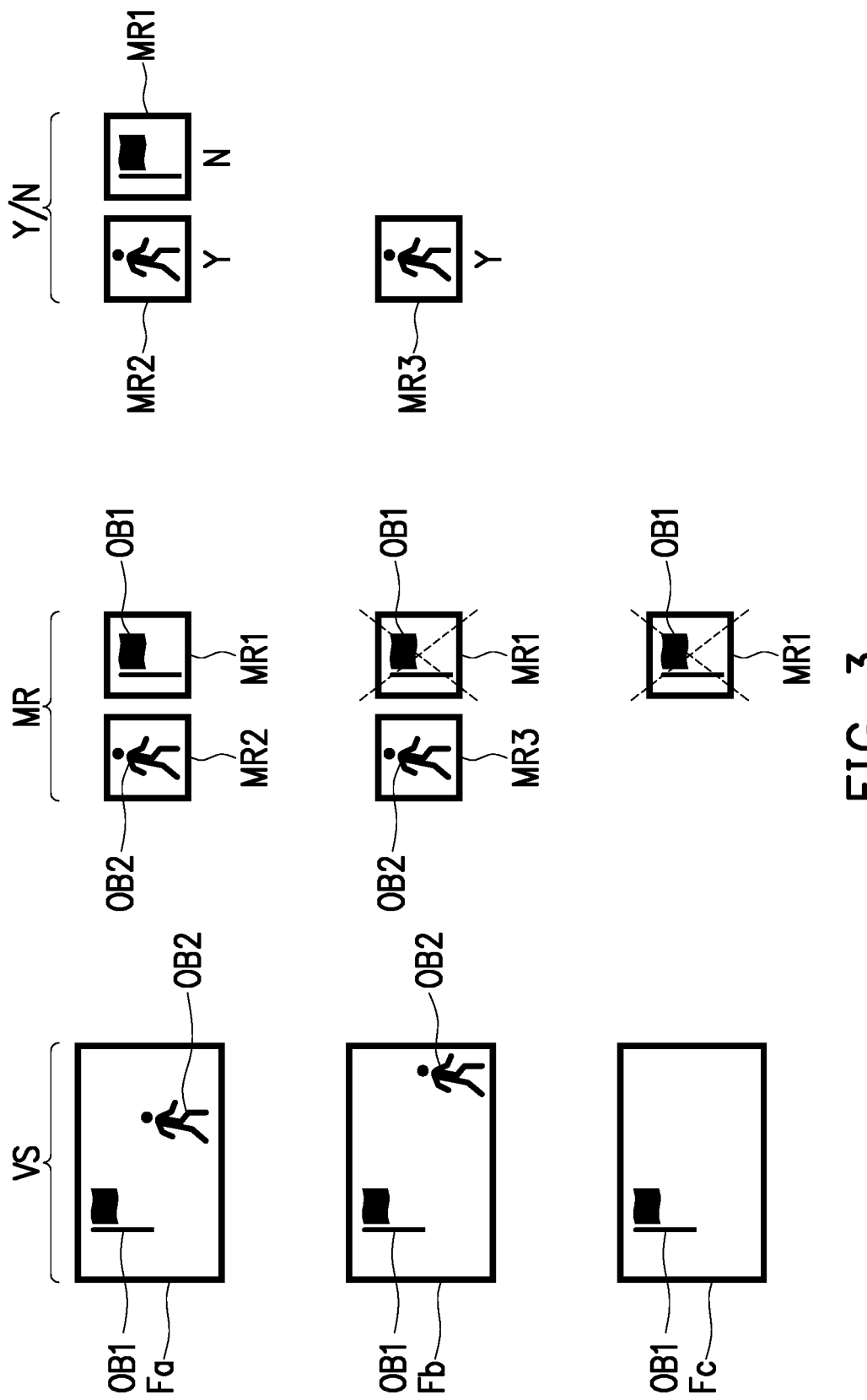

MONITORING DEVICE FOR DETECTING OBJECT OF INTEREST AND OPERATION METHOD THEREOF

BACKGROUND

Technical Field

The invention relates to a monitoring device, and particularly relates to a monitoring device for detecting an object of interest and an operation method thereof.

Description of Related Art

Camera may take images of a monitored field to generate a video stream. A monitoring device may detect whether an object of interest appears in the video stream. When the object of interest appears or does not appear in the video stream, the monitoring device may trigger a corresponding application operation, such as recording, issuing an alarm, and/or other application operations. However, many undesired moving objects (or referred to as objects of no interest) may exist in the monitored field. For example, the monitored field may have a fountain, a waterfall, an electric fan, or other moving objects that do not belong to a monitored object. These undesired moving objects may cause errors in motion detection of the monitoring device, which may lead to false alarms and more power consumption. For example, in a person detection system, periodic or non-periodic moving blades (or a fan) may falsely trigger a motion detection mechanism of the monitoring device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a monitoring device and an operation method thereof to avoid false alarms as much as possible.

In an embodiment of the invention, the aforementioned monitoring device is adapted to detect whether an object of interest appears in a video stream. The monitoring device includes a motion calculation circuit, a motion region determination circuit and a computing engine. The motion calculation circuit is adapted to receive the video stream. The motion calculation circuit is configured to perform a motion calculation on a current frame in the video stream to generate a motion map. The motion region determination circuit is coupled to the motion calculation circuit to receive the motion map. The motion region determination circuit is configured to determine a motion region in the current frame according to the motion map. The computing engine is coupled to the motion region determination circuit. The motion region determination circuit notifies the computing engine with the motion region in the current frame. The computing engine is configured to perform an object of interest detection on the motion region in the current frame of the video stream to generate a detection result. The motion region determination circuit determines whether to ignore the motion region in a subsequent frame after the current frame according to the detection result.

In an embodiment of the invention, the aforementioned operation method includes: performing a motion calculation on a current frame in a video stream by a motion calculation circuit of a monitoring device to generate a motion map; determining a motion region in the current frame by a motion region determination circuit of the monitoring device according to the motion map; notifying a computing engine of the monitoring device with the motion region in the current frame by the motion region determination circuit; performing an object of interest detection on the motion region in the current frame of the video stream by the computing engine to generate a detection result; and determining whether to ignore the motion region in a subsequent frame after the current frame by the motion region determination circuit according to the detection result.

Based on the above description, the monitoring device described in the embodiments of the invention is adapted to perform the object of interest detection on the motion region in the current frame to detect whether there is an object of interest in the motion region. Based on the detection result of the current frame, the monitoring device may decide whether to ignore the motion region in the subsequent frame. For example, when the detection result indicates that the object in a certain motion region is an undesired moving object (or referred to as an object of no interest), the monitoring device may ignore the motion region, thereby avoiding the computing engine to perform the object of interest detection on the motion region to avoid false alarms as much as possible.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic diagram illustrating an operation situation of the monitoring device shown in FIG. 1 according to an embodiment of the invention.

DESCRIPTION OF THE EMBODIMENTS

Figure 1:
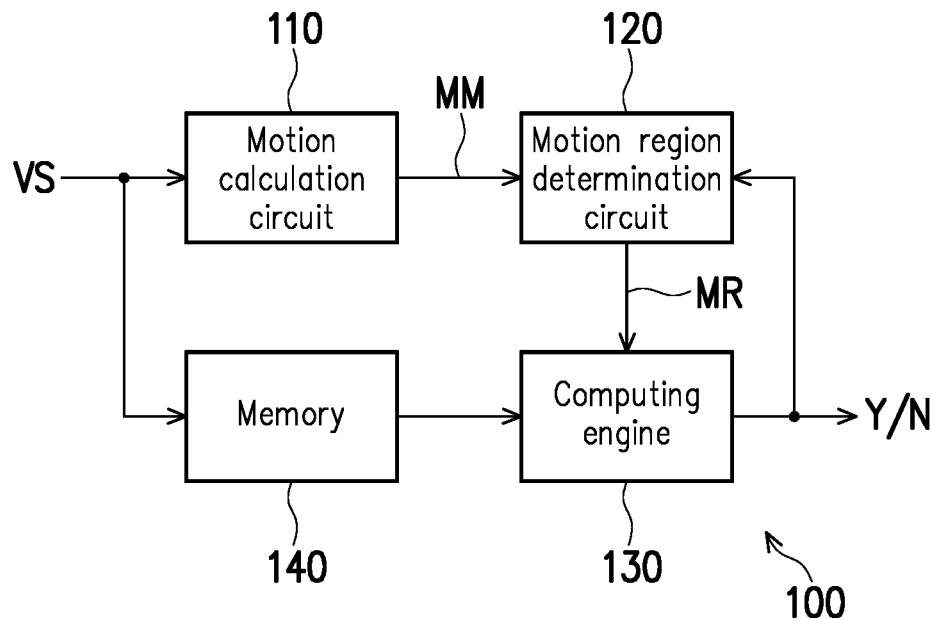
FIG. 1 is a circuit block schematic diagram of a monitoring device according to an embodiment of the invention.

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. "First", "second", etc. mentioned in the specification and the claims are merely used to name discrete components and should not be regarded as limiting the upper or lower bound of the number of the components, nor is it used to define a manufacturing order or setting order of the components. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a circuit block schematic diagram of a monitoring device 100 according to an embodiment of the invention. A camera (not shown) may take images of a monitored field to generate a video stream VS. The monitoring device 100 shown in FIG. 1 may detect whether an object of interest appears in the video stream VS. The object of interest may be determined according to a design requirement and/or application requirement. For example, the object of interest may include a human being or other creatures. When the object of interest appears in the video stream VS, the monitoring device 100 may notify a next level circuit (not shown) with "the object of interest is appeared" through a detection result Y/N (e.g., 1 or 0) to trigger a corresponding application operation. According to the design requirement, in some embodiments, the application operation may include recording, issuing an alarm, and/or other application operations.

The monitoring device 100 shown in FIG. 1 includes a motion calculation circuit 110, a motion region determination circuit 120, and a computing engine 130. The motion calculation circuit 110 is adapted to receive the video stream VS. The motion region determination circuit 120 is coupled to the motion calculation circuit 110 to receive a motion map MM. The computing engine 130 is coupled to the motion region determination circuit 120 to receive information MR related to the motion region. According to different design requirements, the blocks of the motion calculation circuit 110, the motion region determination circuit 120, and/or the computing engine 130 may be implemented in form of hardware, firmware, software (i.e., programs), or a combination thereof.

In terms of hardware, the blocks of the motion calculation circuit 110, the motion region determination circuit 120, and/or the computing engine 130 described above may be implemented by logic circuits on an integrated circuit. Related functions of the motion calculation circuit 110, the motion region determination circuit 120, and/or the computing engine 130 may be implemented as hardware by using hardware description languages (for example, Verilog HDL or VHDL) or other suitable programming languages. For example, the related functions of the motion calculation circuit 110, the motion region determination circuit 120, and/or the computing engine 130 may be implemented in one or more controllers, microcontrollers, microprocessors, and application-specific integrated circuits. Integrated circuits (ASICs), digital signal processors (DSPs), field programmable gate array (FPGAs) and/or various logic blocks, modules and circuits in other processing units.

In terms of software and/or firmware, the related functions of the aforementioned motion calculation circuit 110, the motion region determination circuit 120, and/or the computing engine 130 may be implemented as programming codes. For example, general programming languages (such as C, C++, or a combination thereof) or other suitable programming languages are used to implement the aforementioned motion calculation circuit 110, the motion region determination circuit 120, and/or the computing engine 130. The programming codes may be recorded/stored in a recording medium. In some embodiments, the recording medium, for example, includes a read only memory (ROM), a random access memory (RAM), and/or a storage device. The storage device includes a hard disk drive (HDD), a solid-state drive (SSD) or other storage devices. In some other embodiments, the recording medium may include a "non-transitory computer readable medium". For example, a tape, a disk, a card, a semiconductor memory, a programmable logic circuit, etc., may be used to implement the non-transitory computer readable medium. A computer, a central processing unit (CPU), a controller, a microcontroller, or a microprocessor may read the programming codes from the recording medium and execute the same to implement the related functions of the aforementioned motion calculation circuit 110, the motion region determination circuit 120 and/or the computing engine 130. Moreover, the programming codes may also be provided to the computer (or CPU) via any transmission medium (a communication network or a broadcast wave, etc.). The communication network is, for example, the Internet, a wired communication network, a wireless communication network, or other communication media.

Figure 2:
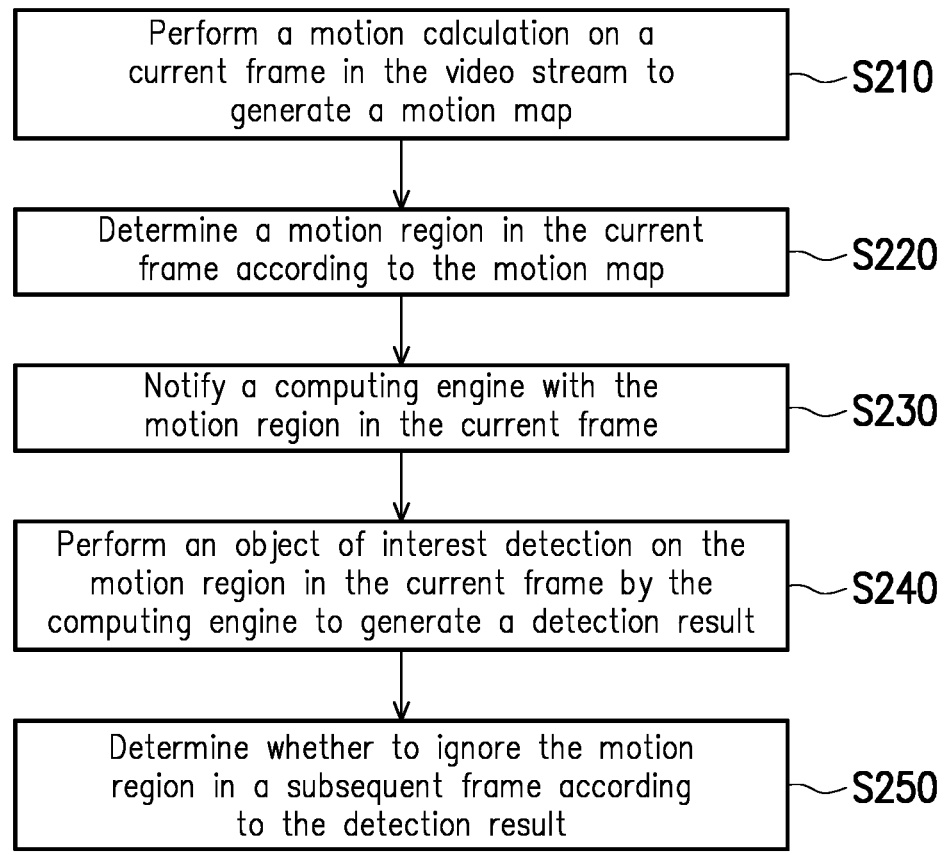
FIG. 2 is a flowchart schematic diagram of an operation method of a monitoring device according to an embodiment of the invention.

FIG. 2 is a flowchart schematic diagram of an operation method of a monitoring device according to an embodiment of the invention. Referring to FIG. 1 and FIG. 2. In step S210, the motion calculation circuit 110 may perform a motion calculation on a current frame in the video stream VS to generate the motion map MM. Implementation of the motion calculation is not limited by the embodiment. According to a design requirement, in some embodiments, the motion calculation circuit 110 may perform a conventional motion estimation algorithm or other motion calculation algorithms to implement the motion calculation to generate the motion map MM. In some embodiments, the motion map MM may include a motion vector of each pixel. In some other embodiments, all pixels of the current frame may be divided into a plurality of pixel groups, and the motion map MM may include a motion vector of each pixel group.

In step S220, the motion region determination circuit 120 may determine a motion region in the current frame according to the motion image MM. For example (but not limited thereto), the motion region determination circuit 120 may define a group of pixels with motion vectors greater than a certain threshold as the motion region, where the threshold may be determined according to the design requirement. In addition, a geometric shape and/or size of the motion region may also be determined according to the design requirement. In step S230, the motion region determination circuit 120 may notify the computing engine 130 with the motion region in the current frame through the information MR.

The monitoring device 100 may also be selectively configured with a memory 140 according to the design requirement to temporarily store partial frames, a complete frame, or a plurality of frames in the video stream VS. The memory 140 may provide the temporarily stored video stream VS to the computing engine 130. In step S240, the computing engine 130 may perform an object of interest detection on the motion region in the current frame of the video stream VS to generate the detection result Y/N to a next level circuit (not shown). Implementation of the object of interest detection is not limited by the embodiment. According to the design requirement, in some embodiments, the computing engine 130 may perform a conventional convolutional neural network (CNN) object detection algorithm or other object detection algorithms to implement the object of interest detection, so as to generate the detection result Y/N.

In addition to providing the detection result Y/N to the next level circuit (not shown), the computing engine 130 further provides the detection result Y/N to the motion region determination circuit 120. In step S250, the motion region determination circuit 120 may determine whether to ignore the motion region in a subsequent frame after the current frame according to the detection result Y/N. For example, when the detection result Y/N of the computing engine 130 indicates that the motion region does not contain the object of interest, the motion region determination circuit 120 may ignore the motion region in the subsequent frame to prevent the computing engine 130 from performing the object of interest detection on the motion region in the subsequent frame. When the detection result Y/N of the computing engine 130 indicates that the motion region contains the object of interest, the motion region determination circuit 120 may notify the computing engine 130 with the motion region in the subsequent frame, so that the computing engine 130 may perform the object of interest detection on the motion region in the subsequent frame.

In case that the motion region determination circuit 120 does not notify the computing engine 130 with any motion region in the subsequent frame, and/or in case that there is no motion region in the subsequent frame, the computing engine 130 is in a sleep mode to reduce power consumption. For example, in case that "the information MR does not have any movement region", the computing engine 130 is idle, so that the computing engine 130 may enter the sleep mode to reduce power consumption.

When the motion region appears in the current frame of the video stream VS, the motion region determination circuit 120 may wake up the computing engine 130, and notify the computing engine 130 with the "motion region in the current frame" through the information MR. The computing engine 130 may perform the object of interest detection on the motion region in the current frame to detect whether an object in the motion region is the object of interest (for example, a person). In case that the detection result Y/N indicates that "the object in the motion region is not the object of interest", the motion region determination circuit 120 may ignore the motion region in the subsequent frame, i.e., the information MR does not have the motion region. Therefore, in case that "the information MR does not have any motion region", the computing engine 130 may enter the sleep mode again.

Considering that object of interest may appear in the ignored motion region, the motion region determination circuit 120 may wake up the computing engine 130 regularly (untimely), and notify the computing engine 130 with the ever ignored motion region again through the information MR. The woken computing engine 130 may again perform the object of interest detection on the motion region to again confirm whether there is the object of interest in the motion region.

FIG. 3 is a schematic diagram illustrating an operation situation of the monitoring device 100 shown in FIG. 1 according to an embodiment of the invention. It is assumed that a video frame Fa shown in FIG. 3 is the current frame in the video stream VS, and the video frame Fa has a moving object OB1 and a moving object OB2. The moving object OB1 is a flag fluttering in the wind (an object of no interest), and the moving object OB2 is a walking person (the object of interest). Through the motion calculation of the motion calculation circuit 110 and the motion region determination of the motion region determination circuit 120, the motion region determination circuit 120 may determine motion regions MR1 and MR2 in the video frame Fa, where the motion region MR1 contains the moving object OB1 and the motion region MR2 contains the moving object OB2. It is noted that the size of motion region is adjustable. Actually, the size is dependent on the moving object. The motion region determination circuit 120 may notify the computing engine 130 with "the motion regions MR1 and MR2 in the video frame Fa" through the information MR. The computing engine 130 may perform the object of interest detection on the motion regions MR1 and MR2 in the video frame Fa to generate detection results Y/N, where the detection result Y/N of the motion region MR1 is "N" (indicating no object of interest), and the detection result Y/N of the motion region MR2 is "Y" (indicating there is the object of interest).

After the video frame Fa is processed, a video frame Fb following the video frame Fa may be taken as the current frame. As shown in FIG. 3, in the video frame Fb, a position of the moving object OB1 is not changed, but the moving object OB2 has moved to a new position. Through the motion calculation of the motion calculation circuit 110 and the motion region determination of the motion region determination circuit 120, the motion region determination circuit 120 may determine motion regions MR1 and MR3 in the video frame Fb, where the motion region MR1 contains the moving object OB1 and the motion region MR3 contains the moving object OB2. Based on the detection result Y/N obtained from the video frame Fa by the computing engine 130, it is known that there is no object of interest in the motion region MR1. Therefore, the motion region determination circuit 120 may ignore the motion region MR1 in the video frame Fb, and notify the computing engine 130 with "the motion region MR3 in the video frame Fb" through the information MR. The computing engine 130 may perform the object of interest detection on the motion region MR3 in the video frame Fb to generate the detection result Y/N, where the detection result Y/N of the motion region MR3 is still "Y" (indicating there is the object of interest).

After the video frame Fb is processed, a video frame Fc following the video frame Fb may be taken as the current frame. As shown in FIG. 3, in the video frame Fc, the position of the moving object OB1 is not changed, but the moving object OB2 has moved out of the frame. Through the motion calculation of the motion calculation circuit 110 and the motion region determination of the motion region determination circuit 120, the motion region determination circuit 120 may determine the motion region MR1 in the video frame Fc, where the motion region MR1 contains the moving object OB1. Since there is no object of interest in the motion region MR1, the motion region determination circuit 120 continues to ignore the motion region MR1 in the video frame Fc. Since there is no object of interest in the video frame Fc, the information MR does not contain any motion region. In case that "the information MR does not contain any motion region", the computing engine 130 is idle, so that the computing engine 130 may enter the sleep mode to reduce power consumption. It should be noted that even if the moving object OB1 keeps moving, since the moving region determination circuit 120 keeps ignoring the moving region MR1, the moving object OB1 will not falsely trigger (wake up) the computation engine 130.

In summary, the monitoring device 100 described in the embodiments of the invention is adapted to perform the object of interest detection on the motion region in the current frame to detect whether there is an object of interest in the motion region. Based on the detection result Y/N of the current frame, the motion region determination circuit 120 may decide whether to ignore the motion region in the subsequent frame. For example, when the detection result Y/N indicates that the object in a certain motion region is an undesired moving object (or referred to as an object of no interest), the motion region determination circuit 120 may ignore the motion region, thereby avoiding the computing engine 130 to perform the object of interest detection on the motion region to avoid false alarms as much as possible.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A monitoring device, adapted to detect whether an object of interest appears in a video stream, the monitoring device comprising:
    a motion calculation circuit, adapted to receive the video stream, and configured to perform a motion calculation on a current frame in the video stream to generate a motion map;
    a motion region determination circuit, coupled to the motion calculation circuit to receive the motion map, and configured to determine a motion region in the current frame according to the motion map; and
    a computing engine, coupled to the motion region determination circuit, wherein the motion region determination circuit notifies the computing engine with the motion region in the current frame, the computing engine is configured to perform an object of interest detection on the motion region in the current frame of the video stream to generate a detection result,
    wherein the motion region determination circuit determines whether to ignore the motion region in a subsequent frame after the current frame according to the detection result.

2. The monitoring device as claimed in claim 1, wherein the object of interest comprises a human being.

3. The monitoring device as claimed in claim 1, wherein the object of interest detection comprises a convolutional neural network object detection.

4. The monitoring device as claimed in claim 1, wherein
    when the detection result of the computing engine indicates that the motion region does not contain the object of interest, the motion region determination circuit ignores the motion region in the subsequent frame to prevent the computing engine from performing the object of interest detection on the motion region in the subsequent frame; and
    when the detection result of the computing engine indicates that the motion region contains the object of interest, the motion region determination circuit notifies the computing engine with the motion region in the subsequent frame, and the computing engine performs the object of interest detection on the motion region in the subsequent frame.

5. The monitoring device as claimed in claim 1, wherein in case that the motion region determination circuit does not notify the computing engine with any motion region in the subsequent frame, or in case that there is no motion region in the subsequent frame, the computing engine is in a sleep mode.

6. An operation method of a monitoring device, wherein the monitoring device is adapted to detect whether an object of interest appears in a video stream, the operation method comprising:
    performing a motion calculation on a current frame in the video stream by a motion calculation circuit of the monitoring device to generate a motion map;
    determining a motion region in the current frame by a motion region determination circuit of the monitoring device according to the motion map;
    notifying a computing engine of the monitoring device with the motion region in the current frame by the motion region determination circuit;
    performing an object of interest detection on the motion region in the current frame of the video stream by the computing engine to generate a detection result; and
    determining whether to ignore the motion region in a subsequent frame after the current frame by the motion region determination circuit according to the detection result.

7. The operation method of the monitoring device as claimed in claim 6, wherein the object of interest comprises a human being.

8. The operation method of the monitoring device as claimed in claim 6, wherein the object of interest detection comprises a convolutional neural network object detection.

9. The operation method of the monitoring device as claimed in claim 6, further comprising:
    when the detection result of the computing engine indicates that the motion region does not contain the object of interest, ignoring the motion region in the subsequent frame by the motion region determination circuit to prevent the computing engine from performing the object of interest detection on the motion region in the subsequent frame; and
    when the detection result of the computing engine indicates that the motion region contains the object of interest, notifying the computing engine with the motion region in the subsequent frame by the motion region determination circuit, so that the computing engine performs the object of interest detection on the motion region in the subsequent frame.

10. The operation method of the monitoring device as claimed in claim 6, further comprising:
    in case that the motion region determination circuit does not notify the computing engine with any motion region in the subsequent frame, or in case that there is no motion region in the subsequent frame, making the computing engine to be in a sleep mode.

* * * * *